(12) United States Patent
Preece et al.

(10) Patent No.: US 6,409,960 B1
(45) Date of Patent: Jun. 25, 2002

(54) METHODS OF MANUFACTURING GOLF CLUB SHAFTS

(75) Inventors: Thomas W. Preece, San Diego; Herb Reyes, Laguna Niguel, both of CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 09/559,162

(22) Filed: Apr. 25, 2000

Related U.S. Application Data

(63) Continuation of application No. 08/918,961, filed on Aug. 26, 1997, now Pat. No. 6,126,557.

(51) Int. Cl.$^7$ .................. B29C 49/20; B29C 43/10; B29C 70/44
(52) U.S. Cl. .................. 264/516; 264/257; 264/258; 264/314; 264/DIG. 50; 156/156; 156/285; 156/287
(58) Field of Search .................. 264/257, 258, 264/314, 317, 313, 516, DIG. 50; 156/156, 285, 287

(56) References Cited

U.S. PATENT DOCUMENTS

| | | |
|---|---|---|
| 1,658,581 A | 2/1928 | Tobia |
| 4,000,896 A | 1/1977 | Lauraitis |
| 4,596,736 A | 6/1986 | Eichhorn |
| 4,793,616 A | 12/1988 | Fernandez |
| 4,889,575 A * | 12/1989 | Roy .................. 156/189 |
| 5,009,425 A | 4/1991 | Okumoto |
| 5,049,422 A | 9/1991 | Honma |
| 5,083,780 A * | 1/1992 | Walton et al. .................. 473/320 |
| 5,260,071 A | 11/1993 | Giles |
| 5,262,118 A | 11/1993 | Fukushina |
| 5,318,296 A | 6/1994 | Adams et al. |
| 5,326,099 A | 7/1994 | Yamamoto et al. |
| 5,429,365 A | 7/1995 | McKeighton |
| 5,534,203 A | 7/1996 | Nelson et al. |
| 5,540,437 A | 7/1996 | Bamber |
| 5,547,427 A | 8/1996 | Rigal et al. |
| 5,580,416 A | 12/1996 | Lin et al. |
| 5,599,242 A | 2/1997 | Solviche et al. |
| 5,626,529 A | 5/1997 | Roy |
| 5,653,646 A * | 8/1997 | Negishi et al. .................. 473/319 |
| 5,692,971 A * | 12/1997 | Williams .................. 473/318 |
| 5,700,543 A * | 12/1997 | Bendlick et al. .................. 428/71 |
| 5,735,752 A * | 4/1998 | Antonious .................. 473/317 |
| 5,755,826 A * | 5/1998 | Beach et al. .................. 473/316 |
| 5,766,090 A | 6/1998 | Orlowski |
| 5,810,676 A * | 9/1998 | Bird .................. 473/319 |
| 5,820,483 A * | 10/1998 | Preece et al. .................. 473/316 |
| 5,984,804 A * | 11/1999 | Berg .................. 473/319 |
| 5,985,197 A * | 11/1999 | Nelson et al. .................. 264/221 |
| 6,030,574 A * | 2/2000 | Banchelin et al. .................. 264/516 |
| 6,071,460 A * | 6/2000 | Renaudin et al. .................. 2664/314 |

FOREIGN PATENT DOCUMENTS

JP 4-348769 3/1992

* cited by examiner

Primary Examiner—Jan H. Silbaugh
Assistant Examiner—Stefan Staicovici
(74) Attorney, Agent, or Firm—Michael A. Catania

(57) ABSTRACT

An improved shaft for a golf club and methods of manufacturing the same. One or more layers of a loaded film are used to define in part the overall weight, swing weight, and/or balance point of a golf club shaft, without significantly affecting the flexibility and/or torsional characteristics of the shaft. A set of plies of pre-preg composite fiber sheet and loaded film may be wrapped in a predetermined manner around a mandrel, placed in a mold, and heated for a predetermined period of time to form a shaft for a golf club.

8 Claims, 3 Drawing Sheets

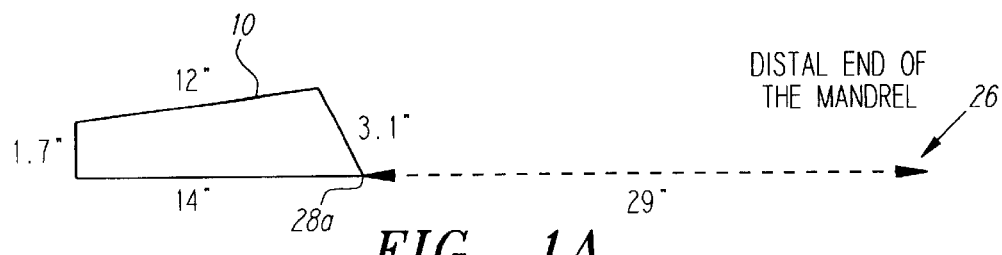
FIG. 1A
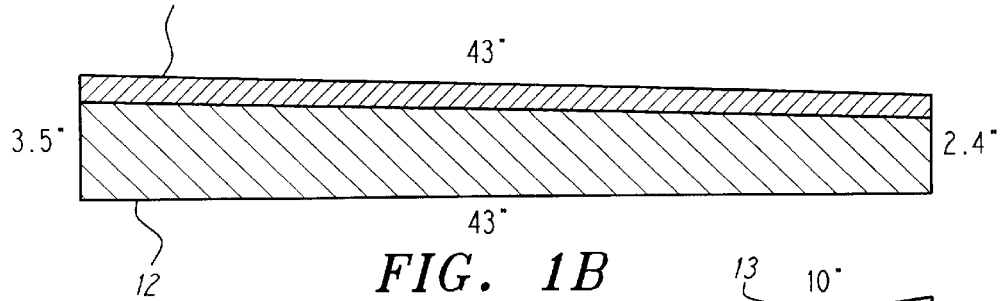
FIG. 1B
FIG. 1C
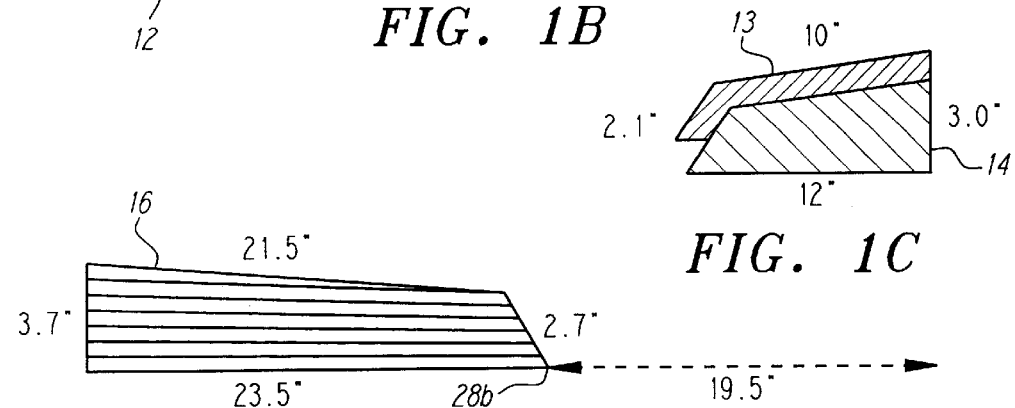
FIG. 1D
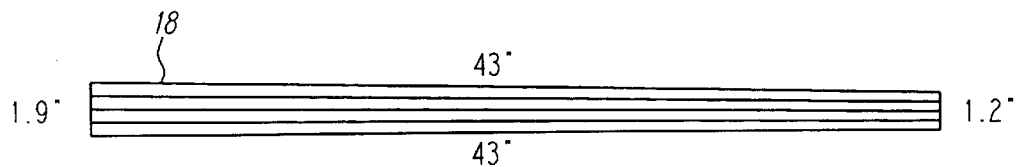
FIG. 1E
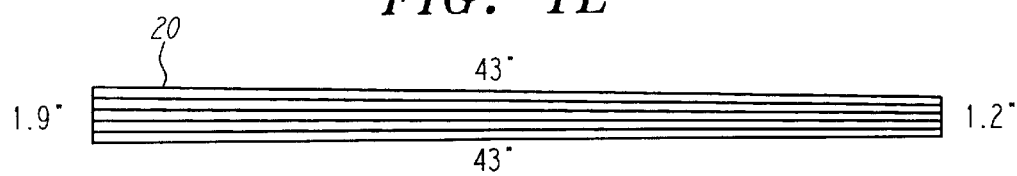
FIG. 1F
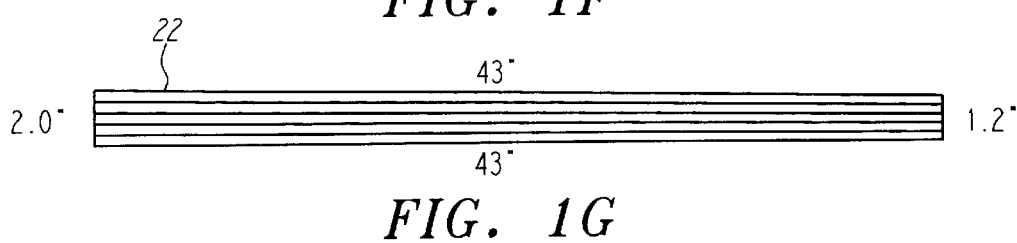
FIG. 1G

METHODS OF MANUFACTURING GOLF CLUB SHAFTS

CROSS REFERENCES TO RELATED APPLICATIONS

The present application is a continuation of U.S. patent application Ser. No. 08/918,961, now U.S. Pat. No. 6,126,557, which was filed on Aug. 26, 1997.

STATEMENT REGARDING FEDERALLY SPONSORED RESEARCH OR DEVELOPMENT

Not Applicable

BACKGROUND OF THE INVENTION

1. Field of the Invention

The present invention relates generally to golf clubs and, more particularly, to composite golf club shafts and methods of manufacturing the same.

2. Description of the Related Art

With the advent of composite golf club shafts, it has become much easier to tailor the design of a golf club to the needs of a particular player or particular shot. For example, for longer shots and lower numbered irons, or woods, it is often desirable to use a more flexible shaft. Whereas, for shorter shots and higher numbered irons, it is often more desirable to use a stiffer shaft. Such design goals may be achieved, for example, through the use of additional layers of composite fiber in shorter shafted clubs and through the use of fewer layers of fiber in longer clubs. Such design goals may also be achieved by varying the orientation of the layers of composite fiber that make up a shaft. For example, to add stiffness to a club shaft it may be desirable to utilize several layers of composite fiber that run parallel to the longitudinal axis of the shaft, whereas to enhance the flexibility of a shaft it may be desirable to utilize several layers of composite fiber which are offset to a substantial degree, for example, +/−45° or more, from the longitudinal axis.

Those skilled in the art will appreciate that each layer of composite fiber may be formed using a "pre-preg" composite sheet, and that pre-preg composite sheets may be manufactured by pulling strands of fiber, for example, carbon or glass fiber, through a resin solution and allowing the resin to partially cure. Exemplary resins or "binding matrices" may include, for example, thermosetting epoxy resins and thermoplastic resins. Alternatively, pre-preg sheets may be manufactured by pulling a fabric or weave of composite fabric through a resin solution and allowing the resin to partially cure. In either case, once the resin is partially cured or "staged," the resin holds the fibers together such that the fibers form a malleable sheet.

Similarly, selected regions of a club shaft may be reinforced through the provision of additional layers of composite fiber and by varying the direction of the composite fibers that may be found in a given layer. Indeed, it is quite common to provide additional layers of composite fiber in the tip region of a shaft to increase the torsional rigidity of the tip region and to insure that the tip region will not be damaged when a club head affixed thereto contacts a ball.

Finally, it has been found that by providing additional layers of composite fiber or by using pre-preg composite sheets having a weighting agent, such as iron, copper or tungsten powder, distributed therein, it is possible to adjust the overall weight, swing weight and balance point of a given shaft with a fairly reasonable degree of precision. Thus, it is possible conventionally to increase the overall weight of shorter club shafts through the use of additional fiber layers or through the use of weighted fiber sheets. Similarly, balance points and swing weights may be adjusted through the selective placement of additional fiber layers or weighted fiber sheets within a shaft.

There are, however, substantial drawbacks that are encountered when conventional techniques are used to adjust to any significant degree the overall weight, swing weight or balance point of a club shaft. For example, the addition of each layer of fiber alters to a significant degree the torsional and longitudinal flexibility characteristics of the shaft. The use of additional layers of fiber may also add substantially to the thickness of the walls of a shaft resulting in a dissimilarity in shaft wall thicknesses within a set. The reason for this is that many layers of fiber will generally be required to achieve a significant increase in shaft mass. It follows that, when conventional methods are used, it can be quite difficult to adjust the weight or distribution of mass within a golf club shaft without also varying to a significant degree the flexibility characteristics of the shaft.

BRIEF SUMMARY OF THE INVENTION

The present invention is directed to methods of manufacturing golf club shafts, wherein the overall weight, swing weight and balance point of a club shaft may be adjusted or defined without simultaneously altering to any significant degree the flexibility characteristics of the shafts. The invention is also directed to club shafts manufactured in accordance with such methods.

Turning first to the structure of golf club shafts in accordance with the present invention, such shafts may be formed from and comprise a plurality of plies of pre-preg composite sheet and one or more plies of a loaded film. The loaded film may comprise a thin resin film that has a weighting agent, for example, copper or iron powder, evenly distributed therein.

Thus, in accordance with the present invention, the type, dimensions, location and orientation of the plies of pre-preg composite sheet within a golf club shaft may be used to define in part the flexibility characteristics of the shaft, while the dimensions and location of one or more plies of loaded film may be used to define and/or adjust in part the overall weight, swing weight and balance point of the shaft. It will also be noted that the shafts of a set of clubs in accordance with the present invention may differ in mass by as much as 80 grams, and possibly more, without incurring substantial differences in the thickness of the shaft wall, profiles or flexibility characteristics.

To manufacture a golf club shaft in accordance with the present invention, the following steps are preferably followed. The dimensions and relative positions of the plies of pre-preg composite fiber sheet and loaded film are determined, and a set of plies to be used in the shaft is prepared. A mandrel having predefined dimensions is selected and covered by a bladder manufactured, for example, from latex. The plies are then wound around the bladder covered mandrel in a predetermined manner, and the wrapped mandrel is placed in a mold. The mandrel may then be removed, leaving the bladder and surrounding plies in the mold. A source of pressurized gas may then be used to inflate the bladder and force the plies of pre-preg and loaded film against the walls of the mold, and the mold may be placed in an oven for a selected period of time, i.e., a time sufficient to allow proper curing of the resin comprising various plies. Thereafter, the bladder may be removed from the core of the shaft, and the shaft itself may be removed from the mold.

Those skilled in the art will recognize, of course, that numerous other methods may be employed to manufacture golf club shafts in accordance with the present invention and that the above-described method is but one example of those methods. For example, in alternative embodiments it may be desirable to leave the mandrel in the mold during the curing process, or it may be desirable to forgo applying internal pressure to the core of each shaft. In such an embodiment, a binding material such as cellophane or polypropylene tape may be wrapped around the outermost ply layer and used to hold the various plies against the mandrel during the curing process.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIGS. 1(a)–1(g) provide an illustration of a set of plies of pre-preg carbon fiber sheet and loaded film that may be used to manufacture a golf club shaft in accordance with one preferred form of the present invention.

DETAILED DESCRIPTION OF THE INVENTION

Turning now to the drawings, FIGS. 1(a)–1(g) provide an illustration of a set of plies of loaded film 10 and pre-preg carbon fiber sheet 11–22 that may be used to manufacture a golf club shaft in accordance with a preferred form of the present invention. Those skilled in the art will appreciate that in alternative forms different composite materials, such as glass fiber, might be used, and that the use of such materials would be an equivalent substitution of components.

As explained above, the pre-preg carbon fiber sheets comprising plies 11–22 may be manufactured by pulling strands of carbon fiber, or a fabric or weave of carbon fiber, through a resin solution and allowing the resin to partially cure. Moreover, when the resin is partially cured, the resin holds the fibers together such that the fibers form a malleable sheet. Exemplary pre-preg carbon fiber sheets may be obtained from Fiberite of Greenville, Tex., or Hexcel of Pleasanton, Calif.

The loaded film from which ply 10 is formed may comprise a thin resin film or binding matrix that has a weighting agent, for example, copper or iron powder, evenly distributed therein. Again, the resin is partially cured 'such that it forms a malleable sheet that may be cut to desired dimensions and then wrapped, for example, around a mandrel. Exemplary films may be obtained from Cytec of Anaheim, Calif. or Bryte of San Jose, Calif., and copper loaded film is presently preferred.

Figure 2:
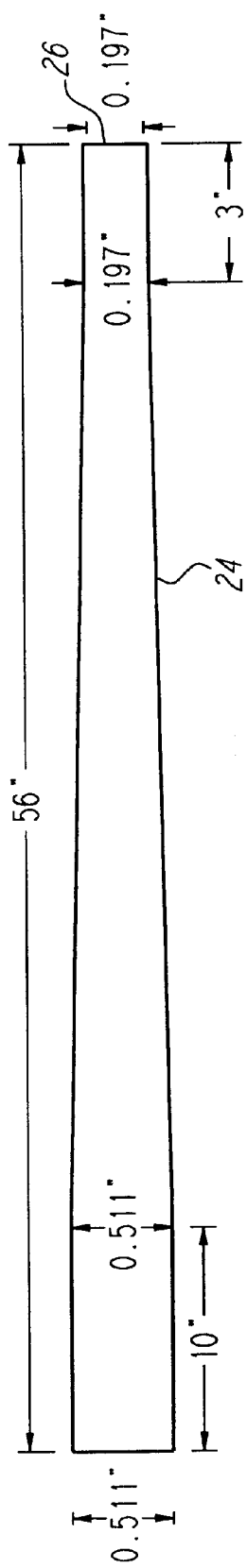
FIG. 2 is an illustration of a mandrel that may be used when manufacturing a golf club shaft using the plies illustrated in FIGS. 1(a)–1(g).

The steps that may be followed in manufacturing a club shaft in accordance with the present invention may proceed, for example, as follows. The dimensions and relative positions of the plies of pre-preg carbon fiber 11–22 and loaded film 10 are determined, and a set of plies 10–22 to be used in the shaft is prepared. A mandrel 24 (shown in FIG. 2) having predefined dimensions is selected and covered by a bladder (not shown). The bladder may be formed, for example, from latex, rubber or silicone. The plies 10–22 are then wrapped around the bladder covered mandrel 24 in a predetermined manner, and the wrapped mandrel is placed in a mold (not shown). Those skilled in the art will appreciate that, unless it is otherwise specified, each ply will generally extend from the distal tip 26 of the mandrel 24 to some specified point along the mandrel 24. Examples of plies that are positioned in this manner are those illustrated in FIGS. 1(b), 1(c) and 1(e)–1(g). For those plies that are not wrapped around the distal tip of the mandrel 24 (for example, those illustrated in FIGS. 1(a) and 1(d)), a wrap starting point 28 is selected at some predetermined distance from the distal tip 26. For example, in FIG. 1(a) the wrap starting point 28a is located 29 inches from the distal tip 26, and in FIG. 1(d) the wrap starting point 28b is located 19.5 inches from the distal tip 26. Finally, those skilled in the art will appreciate that, unless it is otherwise specified, the carbon fibers comprising the various plies are to run parallel to the longitudinal axis 30 of the mandrel 24. However, as indicated by the hatching marks in FIGS. 1(b) and 1(c), the carbon fibers in some of the plies may run in different directions. For example, it will be noted that the fibers of ply 11 (shown in FIG. 1(b)) are offset by +45° with regard to the longitudinal axis 30 of the mandrel 24, and the fibers of ply 12 (also shown in FIG. 1(b)) are offset by −45° with regard to the longitudinal axis 30 of the mandrel 24. The same is true for plies 13 and 14 shown in FIG. 1(c). The pairs of plies illustrated in FIGS. 1(b) and 1(c) are often referred to as sub-assemblies because they are assembled together and then wrapped as a pair around the same portion of the mandrel 24.

After the various plies are wrapped around the mandrel 24 in the prescribed manner, the wrapped mandrel may be placed in a mold and the mandrel 24 may be withdrawn from the bladder leaving the bladder and surrounding plies (for example, plies 10–22) in the mold. A source of pressurized gas may then be used to inflate the bladder and force the plies of pre-preg carbon fiber 11–22 and loaded film 10 against the walls of the mold. The mold may then be placed in an oven for a selected period of time, i.e., a time sufficient to allow proper curing of the resin comprising various plies. Thereafter, the mold may be removed from the oven and allowed to cool, the shaft may be removed from the mold, and the bladder may be removed from the core of the shaft.

Those skilled in the art will appreciate that, depending upon the type of resin used, oven temperatures may range from 250° to 800° F., the requisite curing time may range from a few minutes (for example, in the case of "quick cure" epoxy or thermoplastic resins) to 1.5 hours, and the pressure applied via the latex bladder may range from 0 psi (for some thermoplastic resins) to 300 psi.

Those skilled in the art will also recognize that numerous other methods may be employed to manufacture golf club shafts in accordance with the present invention and that the above-described method is but one example of those methods. For example, in alternative methods it may be desirable to leave the mandrel in the mold during the curing process, or it may be desirable to forgo applying internal pressure to the core of each shaft. In such an alternative method, a binding material, such as cellophane or polypropylene tape, may be wrapped around the outermost ply layer and used to hold the various plies against the mandrel during the curing process, or an external sheath may be placed over the ply wrapped mandrel so that pressure may be applied thereto.

In still another alternative method, the plies of loaded film may be wrapped around the mandrel prior to the mandrel being wrapped in fiber via a filament winding process. In such an embodiment, the loaded film and filament wrapped mandrel may be placed in a mold, and thereafter resin may be injected into the mold.

Figure 3:
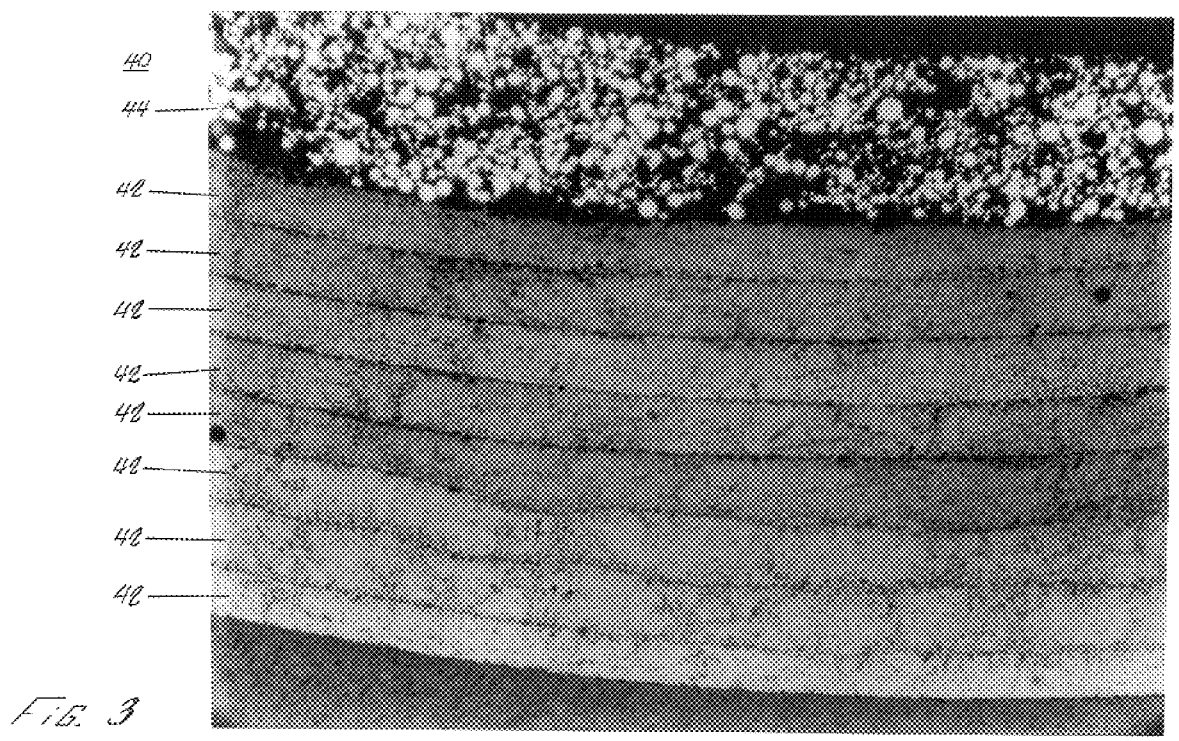
FIG. 3 is an illustration of a cross-section of a wall of a golf club shaft in accordance with a preferred form of the present invention.

Turning now to FIG. 3, a golf club shaft in accordance with a preferred form of the present invention will have a shaft wall structure 40 including a plurality of layers 42 comprising composite fiber fixed within a first resin binding matrix, and at least one layer 44 comprising a weighting agent evenly distributed within a second resin binding matrix. As explained above, the composite fiber preferably comprises carbon fiber, and the first and second resin binding matrices preferably comprise a thermosetting epoxy resin. It should be understood with respect to FIG. 3 that, while the layer of loaded film 44 may appear to be somewhat thicker than the layers of fiber 42, to achieve an increase in mass via the fiber layers 42 comparable to that achieved through the use of the loaded film layer 44 it would be necessary to utilize fiber layers having a total thickness likely three or more times that of the loaded film layer 44. The addition of such a substantial amount of fiber to a shaft would have a profound impact upon the flexibility and torsional characteristics of the shaft.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A method of manufacturing a shaft for a golf club, the method comprising:

providing a mandrel having a proximal and a distal tip, wrapping a plurality of plies of pre-preg composite sheet around the mandrel and wrapping at least one ply of loaded film comprising a weighting agent around the mandrel starting at a point from between 19.5 inches to 29 inches from the distal tip in a predetermined manner, and heating the wrapped mandrel at a temperature from between 250° to 800° F. for up to 1.5 hours to allow a resin comprising the plies of pre-preg composite sheet and loaded film to cure.

2. The method according to claim 1 wherein the weighting agent is copper.

3. The method according to claim 1 wherein a binding material is wrapped around the outermost ply of the plurality of plies of pre-preg sheet.

4. The method according to claim 3 wherein the binding material comprises cellophane tape.

5. The method according to claim 3 wherein the binding material comprises polypropylene tape.

6. The method according to claim 1 further comprising:

covering the mandrel with a latex bladder before the plies of pre-preg composite sheet and at least one ply of loaded film are wrapped around the mandrel;

placing the mandrel and plies of pre-preg composite sheet and at least one ply of loaded film in a mold prior to heating the wrapped mandrel; and inflating the bladder to a predetermined pressure during heating the wrapped mandrel.

7. The method according to claim 1 wherein the plies of pre-preg composite sheet comprise pre-preg carbon fiber sheet.

8. The met according to claim 1 wherein the plies of pre-preg composite sheet comprise pre-preg fiber glass sheet.

* * * * *